Oct. 29, 1957 — T. HINDMARCH — 2,811,233
TORSIONAL DAMPER OR COUPLING
Filed Sept. 27, 1954 — 2 Sheets-Sheet 1

Inventor
T. Hindmarch

Oct. 29, 1957  T. HINDMARCH  2,811,233
TORSIONAL DAMPER OR COUPLING
Filed Sept. 27, 1954  2 Sheets-Sheet 2
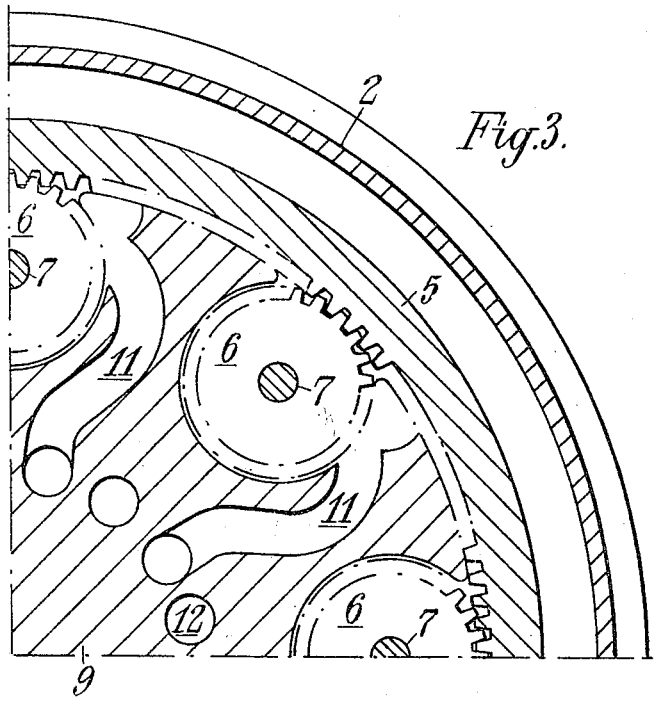
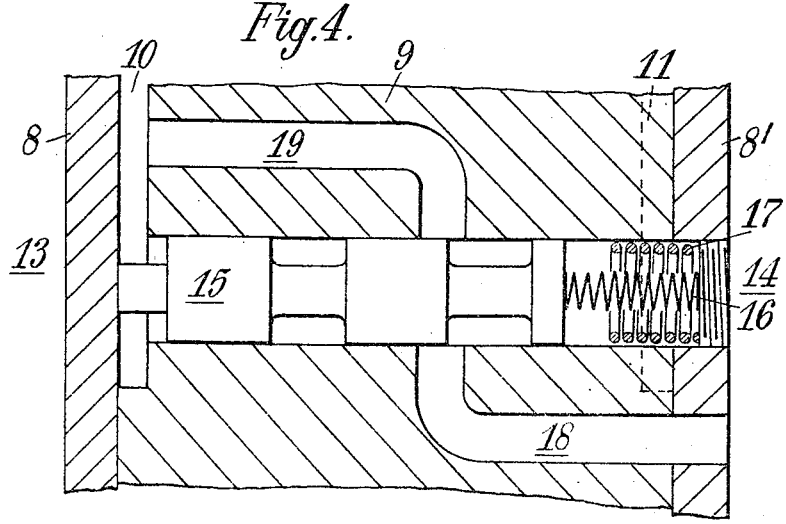
Inventor
T. Hindmarch
By Slascock Downing Seebold
Attys.

United States Patent Office 2,811,233
Patented Oct. 29, 1957

2,811,233
TORSIONAL DAMPER OR COUPLING
Thomas Hindmarch, Chesham, England
Application September 27, 1954, Serial No. 458,647
Claims priority, application Great Britain
September 30, 1953

2 Claims. (Cl. 192—61)

This invention relates to dampers and couplings, and in particular to dampers and couplings constructed to eliminate or suppress torsional oscillations and cyclic variations in power transmission systems.

It has been previously been proposed to provide hydraulic clutches or couplings having a driving and driven member and between them a pump means including liquid channels for the conveyance of liquid between the outlet and inlet sides of the pump means whereby torque is transmitted between the said driving and driven members when the flow of liquid through the pump means is restricted or prevented, and free relative movement is allowed between said members when the flow of liquid is unrestricted. Such constructions have been used for the purpose of making and interrupting the drive between a prime mover and an output shaft, the flow of liquid being under the manual control of the operator, and by means of which a satisfactory smooth take-up of the drive may be provided. Such a clutch or coupling is described and claimed in my United States Patent No. 2,510,225, issued June 6, 1950.

The present invention is particularly concerned with the elimination or suppression of torsional oscillations or cyclic variations in power transmission systems and with that object in view I provide a hydraulic clutch or coupling of the kind above having valve means in the fluid channel associated with the pump means to control the flow of liquid through the pump means, the said valve means automatically allowing the passage of liquid at pressures below and above a predetermined range of pressures.

The invention consists in a hydraulic damper or coupling comprising a driving member and a driven member, liquid channel means associated with at least one of said members, pump means in said channel means for urging the flow of liquid in said channel means by relative rotational movement of said driving and driven members, and liquid flow control means associated with said channel means for controlling the flow of liquid through said channel means to control the resistance to relative rotational movement between the driving and driven members, the liquid flow control means comprising at least one liquid pressure operated valve which allows restricted flow of the liquid through the channel means up to a predetermined maximum low operating pressure and above a predetermined minimum high operating pressure and allows substantially no flow of liquid therethrough at all pressures between said maximum low operating pressure and said minimum high operating pressure.

When the torque has to be transmitted in both directions of rotation I provide two sets of valve means each of which controls the flow of liquid during the transmission of torque in each direction through the coupling.

When a coupling constructed in accordance with the invention is connected between a prime mover and a power output shaft either directly or via change speed or change direction gearing and the drive is first initiated by means of an isolating clutch, the pumping means commences to circulate the liquid through the valve means and little or no torque is transmitted until a pressure is built up, due to the restriction of the valve and passage associated therewith, equalling the low pressure of the predetermined range of pressures. The valve means then closes and the flow of liquid is prevented, thus no longer circulating liquid and the two parts of the pump become locked and the driving and driven members rotate together.

As the prime mover is accelerated and the speed at which torsional vibration occurs is reached, the sudden rise of pressure which occurs at each positively running half cycle of the oscillation causes the pressure to rise momentarily and steeply above the upper limit of the predetermined range of pressures and the valve opens allowing the liquid to flow which allows the driving member to overrun the driven member a few degrees of rotation during the positive half cycle of the torsional vibration. When the negative half cycle occurs the direction of flow of the fluid is reversed and the pressure operating the valve means falls to a low value, thus allowing the valve to open and permit relative movement between the driving and driven members.

In the form of construction having two sets of valve means which allows of the device to operate in both directions of rotation, one set of valve means is in operation for the current direction of drive while the other valve means is open, being on the suction side of the pump means, and therefore when the negative half of each cycle of vibration occurs and the flow of liquid is reversed, the second valve means is already open and free relative rotation is immediately possible during the short period of vibration.

In one form of construction in accordance with my invention I provide an outer annular ring or driven member, having machined on the internal periphery equally pitched gear teeth, and upon a carrier or driving member a number of planetary pinions meshing with the outer annular gear and distributed symmetrically around the same.

The carrier is constructed in the form of a solid metal disc with suitably shaped recesses spaced around the periphery, each being arranged so as to take one of the planetary pinions, leaving a small clearance between the tops of the pinion teeth and the bore of the recess, the pinions being suitably mounted in bearings. The planet carrier is rigidly attached to a rotatable input shaft. A number of shaped passages are formed in the body of the planet carrier connecting with the recesses housing the pinions which form inlet and outlet ports in a manner similar to that commonly employed in a gear pump and connect with the supply of working fluid.

In the passages are located spring loaded valves by means of which limited flow is permitted up to a predetermined pressure and when that pressure is reached then the flow is cut off and remains so cut off until a predetermined high pressure is reached at which point flow is permitted and continues so long as the predetermined high pressure is exceeded. For a unidirectional condition of operation half the valves may be eliminated and the ports left free, while in other conditions a restricted functioning of the valves is all that is necessary.

A casing is attached to the outer annular ring which encloses the whole assembly and liquid sealing means between the casing and the input shaft are provided. An output shaft is bolted to the casing and hence the outer ring. In some cases I may interchange the connections of the input and output shafts.

The casing is filled with a viscous, heat resisting, high viscosity temperature ratio liquid which serves as the working fluid. The casing may be arranged with fins or other protuberances for the purpose of dissipation of heat.

Due to the practical necessity for physical clearance between the meshed teeth of the pinions and the annular gear, clearance between the outer periphery and the tips of the teeth of the annular gear, clearance between the end faces of the pinions and the side plates attached to the annular gear and clearance between the sides of the planet carrier disc and the side plates, a certain amount of leakage of the viscous fluid from the high pressure region to the regions of lower pressure occurs, bringing about a slight slip or creeping which however is not sufficient to generate excessive heat or seriously to diminish the power as between driven and driving shafts.

The accompanying drawings show, by way of example only, one embodiment of my invention in which:

Figure 3 is a part transverse section on the line 3—3 of Figure 1, and

Figure 4 is a detail section of the valve 12 on the same plane as Figure 1.

Figure 1:
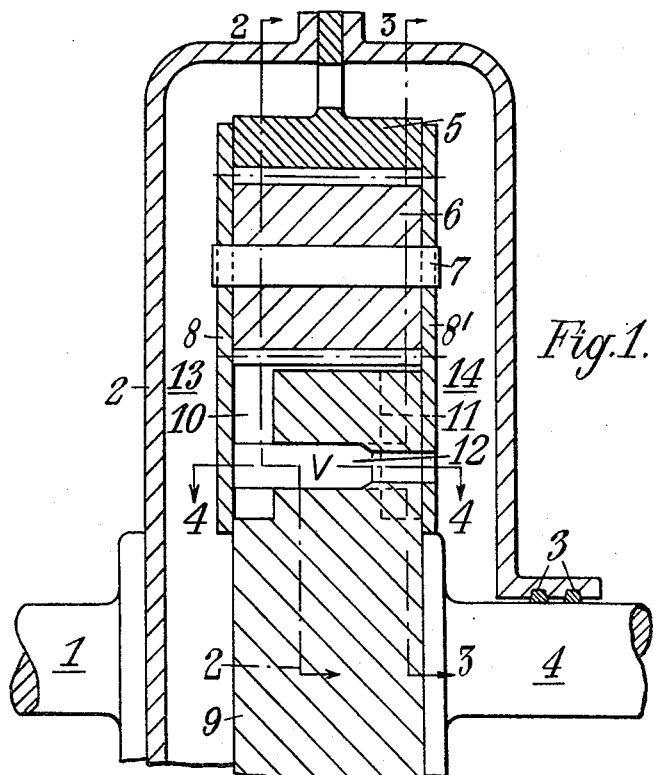
Figure 1 is a longitudinal half section of the coupling.
Figure 2:
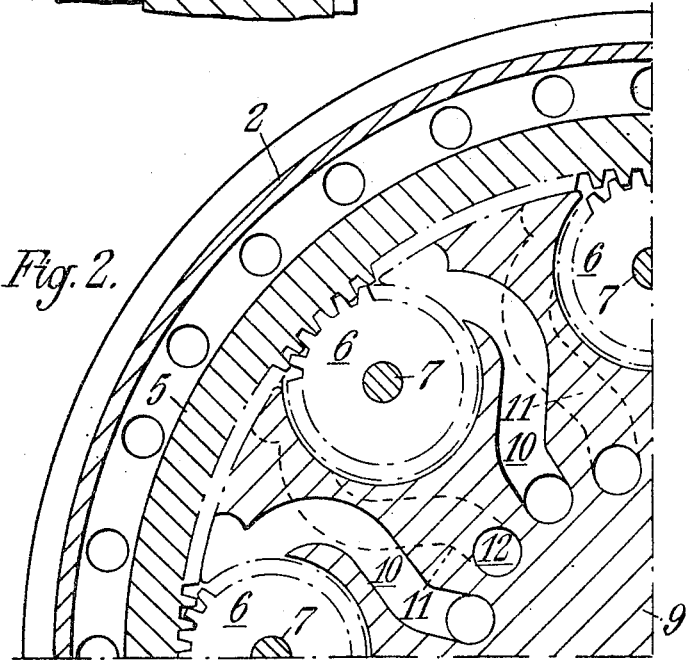
Figure 2 is a part transverse section on the line 2—2 of Figure 1.

Figure 1 is a longitudinal section in which an input shaft 1 is connected to an outer casing 2 which is provided with sealing means 3 bearing on output shaft 4. The outer casing is connected to the annulus gear 5 which meshes with the planet gears 6 which are carried on stationary shafts 7 carried in side plates 8, 8' which are rigidly attached to the main body 9. This main body is rigidly connected to the output shaft 4. Channels 10 and 11 are formed in the main body and are so arranged that one becomes the suction channel and the other the delivery channel for one direction of relative rotation between the annulus gear 5 and the main body 9, and vice versa for the opposite direction of relative rotation. Each channel has a connection via valve 12 (which is here shown purely diagrammatically and which is described in detail in reference to Figure 4), with one of the spaces 13, 14 between the main body and the outer casing. Thus for each gear element 6 one channel connects via its valve 12 with space 13, while the other channel connects via its valve with space 14. When there is flow the delivery is thus on the opposite side to the suction, thus causing a flow in the outer casing and permitting the maximum amount of cooling of the working fluid.

Figure 4 shows one construction of a valve having the required characteristics. A piston valve 15 is controlled by a light spring 16 and in the drawing is held over to the left. When channel 10 is the suction channel there is no movement of the valve and the fluid can flow from space 14 via ways 18 and 19 and the valve 15 to channel 10. When the direction of relative rotation is reversed, the fluid can flow from channel 10 to space 14, but as the valve opening is restricted and owing to the large pumping capacity of the gear elements in relation to the size of the restriction, the pressure builds up slowly in channel 10 and when it reaches a predetermined value, valve 15 moves to the right, closing the connection between ways 18 and 19. Further rise in pressure causes the valve to contact heavy spring 17 which resists further movement of the valve until the pressure in channel 10 builds up to the maximum permitted, when the valve moves further, compressing spring 17 and re-establishes the connection between ways 18 and 19 and so keeps the pressure down to a predetermined value.

I can vary my design of valve in a number of ways and my invention is not restricted to the type illustrated. Likewise I can make the driving member have planetary gears external to the driven member in place of the internal geared annulus as shown.

Furthermore I may use any suitable pump means for producing the required pressure in the working liquid, and I may vary the details of my valve to provide time lag at torque reversal.

The coupling or damper hereinbefore described is constructed as a unit containing all the essential elements for its operation, but details for carrying the invention into effect may be varied without departing from the scope of the invention.

I claim:

1. A hydraulic damper or coupling to eliminate torsional oscillations comprising a driving member and a driven member, liquid channel means associated with at least each one of said members, pump means in said channel means for urging the flow of liquid in said channel means by the relative rotational movement of said driving and driven members, and axially disposed liquid flow control means associated with said channel means for controlling the flow of liquid through said channel means to control the resistance to relative rotational movement between the driving and driven members, the liquid flow control means comprising at least one liquid pressure operated valve which allows restricted flow of the liquid through the channel means up to a predetermined maximum low operating pressure and above a predetermined minimum high operating pressure and allows substantially no flow of liquid therethrough at all pressures between said maximum low operating pressure and said minimum high operating pressure, the pump means including planetary pinions mounted for rotation in circular recesses in the driven member, said recesses having ports on diametrically opposite sides thereof, each of said ports communicating by means of a passage with the liquid pressure operated valve, said liquid pressure operated valve comprising a cylinder, a piston reciprocable longitudinally of the cylinder by the liquid pressure exerted by the pump means, spring means serving to oppose such reciprocation of the piston, port means in the walls of the cylinder and on opposite sides thereof and the piston having a pair of spaced recesses which register with the ports in the cylinder walls to provide communication therebetween at two spaced positions of the piston.

2. A hydraulic damper or coupling to eliminate torsional oscillations comprising a driving member and a driven member, liquid channel means associated with at least each one of said members, pump means in said channel means for urging the flow of liquid in said channel means by the relative rotational movement of said driving and driven members, and axially disposed liquid flow control means associated with said channel means for controlling the flow of liquid through said channel means to control the resistance to relative rotational movement between the driving and driven members, the liquid flow control means comprising at least one liquid pressure operated valve which allows restricted flow of the liquid through the channel means up to a predetermined maximum low operating pressure and above a predetermined minimum high operating pressure and allows substantially no flow of liquid therethrough at all pressures between said maximum low operating pressure and said minimum high operating pressure, said liquid pressure operated valve comprising a cylinder, port means in opposite side walls of the cylinder and intermediate its ends, a rod-like piston working in the cylinder and having two spaced circumferential recesses, each of which when positioned opposite the port means in the walls of the cylinder allow passage of liquid across the cylinder from port means to port means, and when positioned either side of said recesses or to one side of said recesses closes the valve for passage of liquid, a closure for one end of the cylinder, spring means between the end of the piston and the closure, with the closure serving as an abutment for the spring means, and a connection between the other end of the cylinder and the inlet to the valve.

References Cited in the file of this patent

UNITED STATES PATENTS

| 2,382,114 | Stephens | Aug. 14, 1945 |
| 2,498,733 | Boxer | Feb. 28, 1950 |
| 2,652,911 | Somers | Sept. 22, 1953 |

FOREIGN PATENTS

| 53,009 | France | Sept. 11, 1944 |